United States Patent [19]

Millard

[11] Patent Number: 4,603,505

[45] Date of Patent: Aug. 5, 1986

[54] PORTABLE ELECTRONIC INSECT CONTROLLER

[76] Inventor: Lance Millard, 2820 E. 36th Ct., Des Moines, Iowa 50317

[21] Appl. No.: 498,925

[22] Filed: May 26, 1983

[51] Int. Cl.$^4$ .......................... A01M 1/22; A01M 1/04
[52] U.S. Cl. ........................................ 43/112; 43/113; 362/179; 431/253
[58] Field of Search .................. 43/112, 113; 431/253; 362/171–182, 312, 316

[56] References Cited

U.S. PATENT DOCUMENTS

| | | | |
|---|---|---|---|
| 1,962,420 | 6/1934 | Bradley | 43/112 |
| 2,061,458 | 11/1936 | Folmer | 43/112 |
| 2,263,659 | 11/1941 | Tullis | 362/179 |
| 2,881,554 | 4/1959 | Laine | 43/112 |
| 3,758,980 | 9/1973 | Bialobrzeski | 43/112 |
| 4,158,268 | 6/1979 | DeYoreo | 43/112 |
| 4,248,005 | 2/1981 | Hedstrom | 43/112 |

Primary Examiner—Gene P. Crosby
Attorney, Agent, or Firm—Zarley, McKee, Thomte, Voorhees & Seas

[57] ABSTRACT

A portable electronic insect controller is provided wherein a electrified alternately polarized grid surrounds a light emitting region of a camping lantern. The grid includes a bottom and top ring spaced apart and substantially parallel to each other. Bars attached to the rings extend upward from the bottom ring and downward from the top ring in a spaced arrangement. A grid bracket includes grid posts which attach to the bottom ring and extend downward to engage a collar which extends around the outside of the lantern and is pulled securely against the lantern by buckle snap connectors. A base is provided onto which the lantern is secured and into which is housed a power source for electrification of the grid. The power supply steps up voltage from either a direct current source or alternating current source to a high enough voltage to arc across from one bar to the next when an insert enters the region between the bars. A safety interconnect strap connects the power supply and the grid carrying electrical energy to the grid. The interconnect strap overlays the filling spout of the lantern and must be removed prior to refueling of the lantern, thus preventing refueling while the grid is electrified. During operation a high voltage standing wave is alternately polarized on the bars and when an insect passes near the bars, the electric charge arcs between the bars and the insect, thus killing the insect.

15 Claims, 8 Drawing Figures

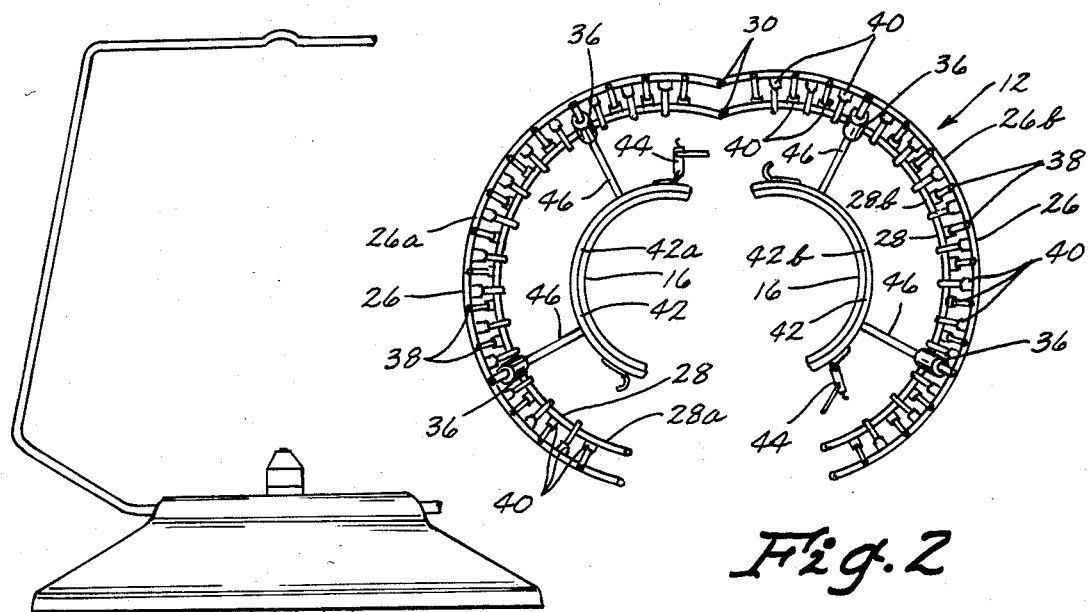
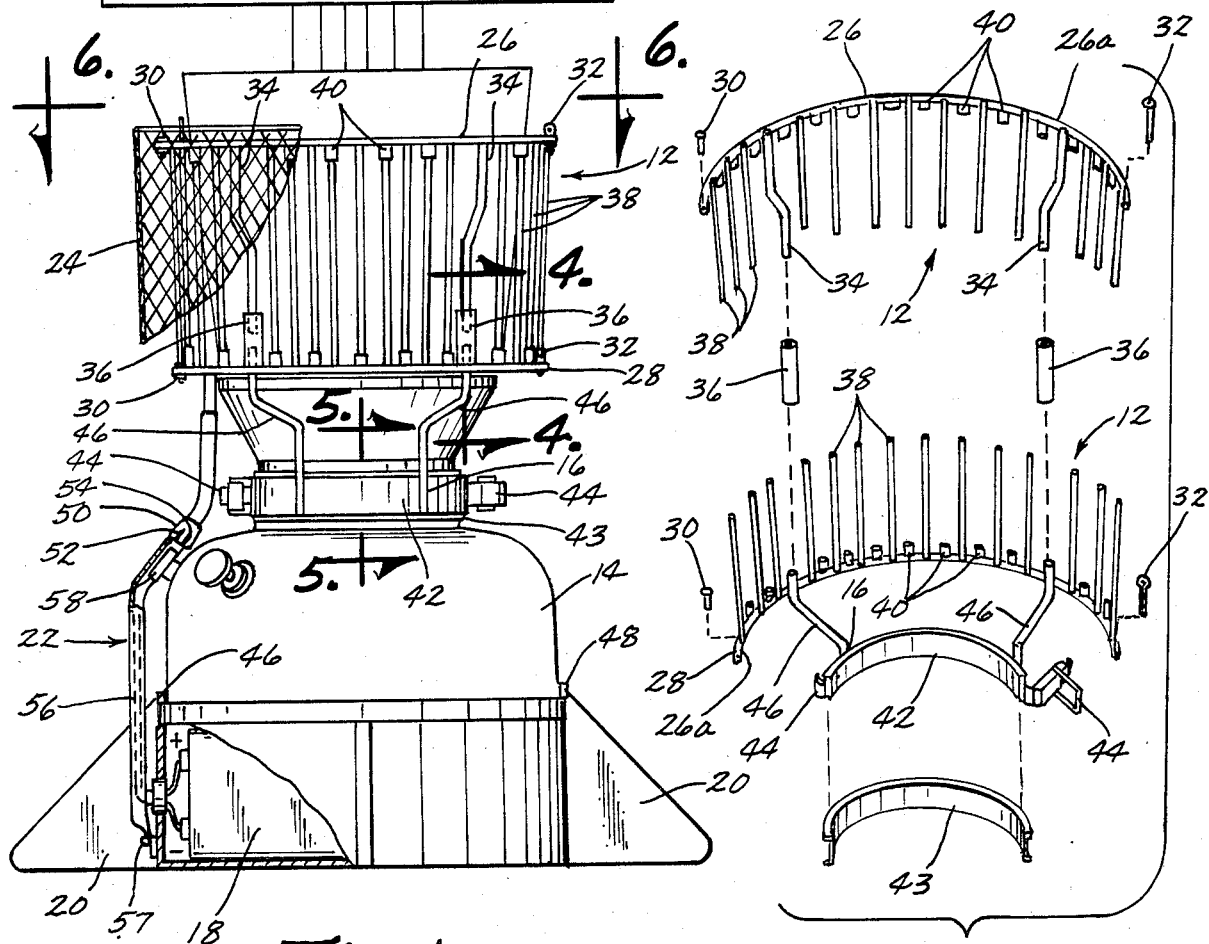
Fig. 1　Fig. 2　Fig. 3

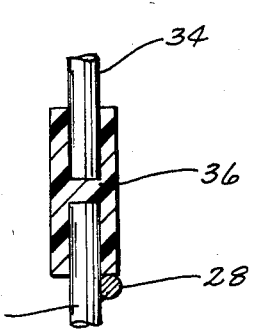
Fig. 4
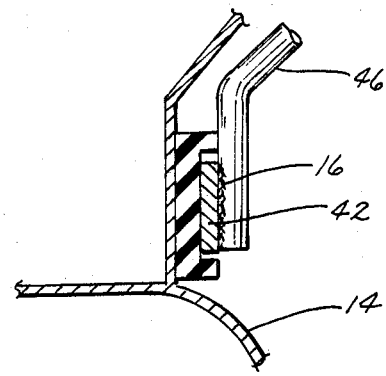
Fig. 5
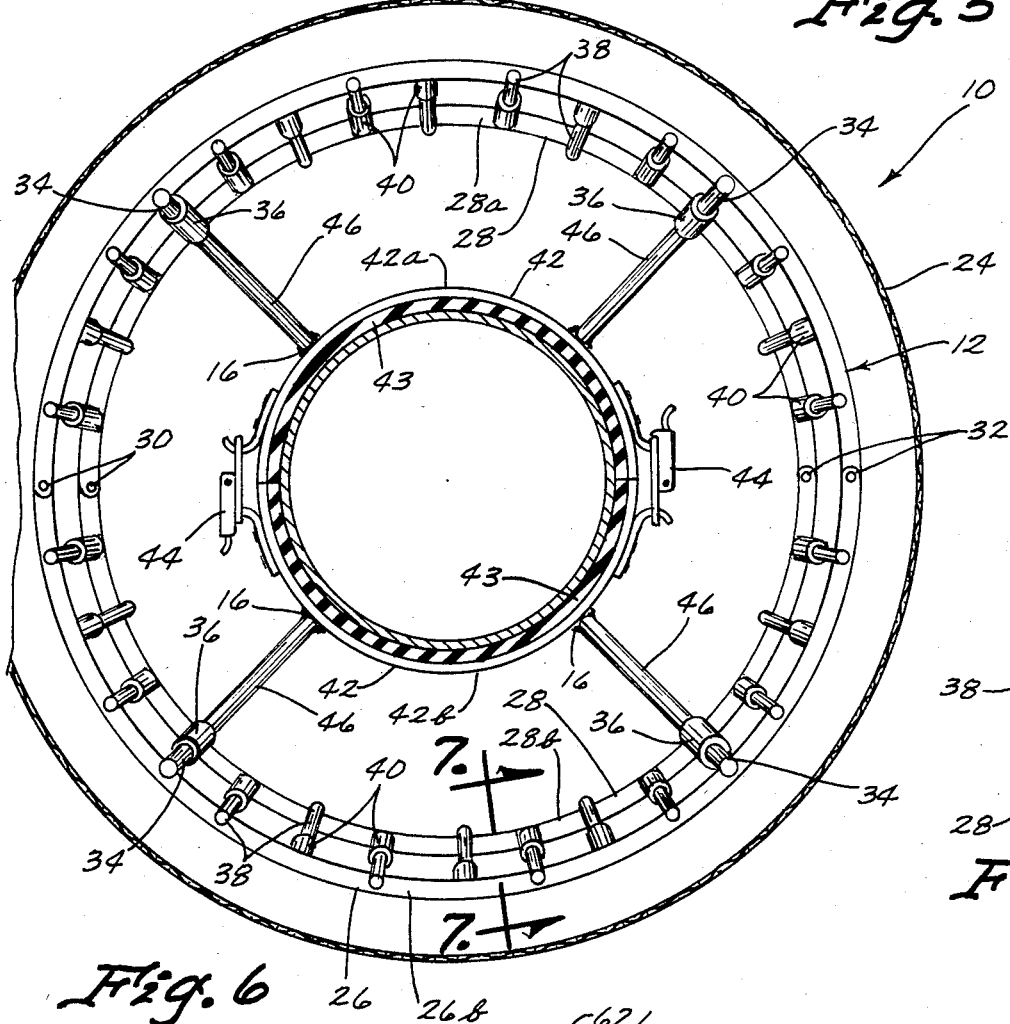
Fig. 6
Fig. 7
Fig. 8

PORTABLE ELECTRONIC INSECT CONTROLLER

BACKGROUND OF THE INVENTION

1. Field of the Invention:

The present invention relates to insect control equipment and more specifically to insert control equipment for use in a camping environment where no external power is available.

2. Description of the Prior Art:

In recent years the interest in camping and related outdoor activities has greatly increased as recreation for people. Often times these activities include being outside during evening and night conditions where an external light source is necessary for illumination of the immediate surrounding area. The illumination where necessary, also attracts insects typically of a flying type, into the immediate area and frequently becomes a nuisance to the people occupying the area. There are presently many methods for control of the insects, such as insecticides sprayed into the area to be occupied, applying a repellent to the exposed body portions and/or clothing or providing a physical barrier between the insects and the person such as a net. However, many of the purported solutions often have associated with them undesirèable countereffects which may limit and/or exclude their application, including the use of toxic, harmful to man and wildlife and relatively short time effectiveness chemicals. Further, the use of physical barriers, such as a net severly restricts movement and provides relief only in a small area. Other problems encountered in insect control result from there being no external energy source available, thus conventional means excluding chemicals and barriers are essentially non-existent.

SUMMARY OF THE INVENTION

A portable insect controller including a electrified alternately polarized grid surrounding the light emitting area of a camping lantern. Top and bottom rings spaced apart with bars extending upward from the bottom ring and downward from the top ring comprise the grid. A grid bracket includes grid posts attached to the bottom ring extending downward to a collar which is secured to the lantern. A base supports the lantern and houses a power supply which includes a converter connected to a power source for stepping up the voltage. Safety interconnect strap connects the power supply to the grid and overlaps the filling spout of the lantern. A standing high voltage wave is alternately polarized on the bars and arcs between adjacent bars when an insect enters the region between two bars, thus killing the insect.

DESCRIPTION OF THE DRAWING

FIG. 1 is a cross-sectional side view of the portable electronic insect controller of this invention;

FIG. 2 is an exploded top view of the grid assembly of the present invention;

FIG. 3 is an exploded perspective view of one-half of the grid assembly;

FIG. 4. is a partial cross-sectional view taken along lines 4—4 of FIG. 1;

FIG. 5 is a partial cross-sectional view taken along lines 5—5 of FIG. 1;

FIG. 6 is a cross-sectional view taken along lines 6—6 of FIG. 1;

FIG. 7 is a cross-sectional view taken along lines 7—7 of FIG. 6; and

FIG. 8 is a block diagram illustrating the power supply equipment.

DESCRIPTION OF THE PREFERRED EMBODIMENT

Referring now to the drawings wherein like referenece numerals designate identical or corresponding parts throughout the several views, the portable electronic insect controller of the present invention is illustrated generally at 10 in FIG. 1.

The insect controller 10 (FIGS. 1, 3, 6 and 8) includes generally an electrified grid assembly 12 secured to a conventional liquid fuel camping lantern 14 by a grid bracket 16. A power supply 18 is housed in a base 20 and is electrically connected to the grid 12 by a safety interconnect strap 22 and a guard 24 overlays the grid 12.

Specifically, the grid 12 (FIGS. 1–7) is constructed of electrically conductive material and includes a top ring 26 and a bottom ring 28 spaced apart and defining generally the light emitting area of the lantern 14. Each ring 26 and 28 includes two half sections 26a and 26b and 28a and 28b respectively. The half sections 26a and 28a are respectively joined to half sections 26b and 28b by rivets 30 about which each half section rotates and removable pins 32 at their opposite end, to hold each ring 26 and 28 in a circular form. Spacing posts 34 extend vertically between the rings 26 and 28 and are interconnected by an insulating connector 36. The posts 34 rigidly hold the rings 26 and 28 in their spaced relationship while still maintaining the rings 26 and 28 electrically isolated from each other.

Bars 38 extend upward from the bottom ring 28 and downward from the top ring 26 in an alternating pattern and generally spaced parallel to each other. The bars 38 are electrically conductive from their specific ring 26 and 28. Insulating tips 40 extend over the end of the bars 38 and are secured to the rings 26–28 that is opposite the electrically conductive ring from which the bar 38 extends. The tips 40 prevent bending of the bars 38 and their physically contacting the adjacent bar, also providing the rings 26 and bars 38 and rings 28 and bars 38 with electrical isolation from each other. The grid 12 is attached to the lantern 14 by a bracket 16 which includes a collar 42 which is severed into two halves forming sections 42a and 42b which are held together by buckle snaps 44. Posts 46 are rigidly secured to the collar 42 and extend upward and contact the bottom ring 28 and hold the rings 26 and 28 and bars 38 in a fixed spaced relationship relative to the light emitting area of the lantern 14. The collar 42 (FIG. 5) is isolated from the lantern 14 by an insulating strip 43. The complete grid assembly 12 (FIGS. 2–3) may be removed from the lantern by opening the buckle snaps 44 and removing the pins 32.

The power supply 18 may be of many designs. For field operation typically a D.C. storage cell will be utilized for the power source 60, however, an A.C. source where adaptable may be used. A conventional converter 62 is connected to the D.C. power source 60 and an conventional inverter 63 is used where an A.C. power source 60 is employed. A converter 62-inverter 63 steps up the voltage to several thousand volts, typically between one and one-half and six thousand volts with a current of less than six milliamperes. The specific voltage and current being in part dependent upon the spacing of the bars 40 and the capacity of the power source 60.

The base 20 is secured to the lantern 14 by a hinge 46 and clevis 48 (FIG. 1) and provides support for the lantern 14. Extending between the power supply 18 housed in the base 20 and the grid 12 is the safety interconnect strap 22. The strap 22 is removably connected to the power supply 18 by a conventional plug 50 and includes a positive 52 and a negative 54 conductor which are connected to the power supply 18. A solid portion 56 extends between the conductors 52 and 54. The strap 22 passes directly over the fill spout 58 of the lantern 14, thus preventing refueling of the lantern 14 without first disconnecting the strap 22 from the power supply 18 via the plug 50 and rotating the lower portion 56 of the strap 22 by hinges 57 out from the fill spout 58. One of the conductors 52/54 is electrically connected to the ring 26 and the other conductor 52/54 likewise connected the ring 28. The grid 12 is thus charged with an opposite electric charge occurring on the rings 26–28 and adjacent bars 38.

A guard 24 extends around the outside area of the grid 12 to prevent an accidental contact with the grid 12 when it is electrically charged. The guard permits insects to freely pass through, while still preventing contact with the grid 12 by an individual near the insect controller 10.

During operation of the insect controller 10, the power supply 18 charges the grid 12 with a high voltage standing wave, alternately polarized on the individual bars 40 of the grid 12. When an insect passes near two of the bars 40, the resistance between the bars 40 is reduced, thus the electric charge arcs between the bars 40 and the insect, thus killing the insect. The insect controller 10, while utilizing a D.C. storage cell for the power source 60, is fairly moveable from location to location. The light emitted by the lantern 14 attracts the insects and they are eliminated by the action of the grid 12.

I claim:
1. A portable electronic insect controller, comprising:
   an electrified grid means being alternately polarized with a high voltage in association with a light producing camping lantern for electrocuting insects when they move within close proximity of the grid;
   a power supply means for supplying a controlled source of electrical energy to the grid;
   a base for supporting the camping lantern and housing the power supply means;
   said grid means including a bottom and top ring, said rings being substantially parallel to each other, spaced apart and including bars, said bars extending upward from the bottom ring and downward from the top ring in a spaced arrangement and electrically isolated from each other;
   said grid means further including a grid bracket, said bracket engaging the rings and the lantern to securely hold the rings and bars in a fixed position; and
   a safety interconnect means for electrically connecting the power supply means to the grid means and preventing the refueling of the lantern without disconnecting the grid means from the power supply means.

2. A portable electronic insect controller as claimed in claim 1 further including a guard, said guard being spaced overlaying the grid means for preventing accidental contact with the grid means.

3. A portable electronic insect controller as claimed in claim 1 wherein the power supply means includes a direct current power source electrically connected to a converter for stepping up the voltage in excess of one and one-half kilovolts, said voltage passing to the safety interconnect means.

4. A portable electronic insect controller as claimed in claim 1 wherein said lantern includes a fuel refill opening and a cap normally closing said refill opening, said safety interconnect means includes a separable strap electrically extending between said power supply means and said grid means and being positioned in covering relation over said cap whereby said strap must be separated thereby opening a circuit including said power supply means and said grid means before said cap can be removed from said refill opening to permit refueling of said lantern.

5. A portable electronic insect controller, comprising:
   an electrified grid means being alternately polarized with a high voltage in association with a light producing camping lantern for electrocuting insects when they move within close proximity of the grid;
   a power supply means for supplying a controlled source of electrical energy to the grid;
   a base for supporting the camping lantern and housing the power supply means;
   said grid means including a bottom and top ring, said rings being substantially parallel to each other, spaced apart and including bars, said bars extending upward from the bottom ring and downward from the top ring in a spaced arrangement and electrically isolated from each other;
   said grid means further including a grid bracket, said bracket engaging the rings and the lantern to securely hold the rings and bars in a fixed position; and
   a guard spaced overlaying the grid means for preventing accidental contact with the grid means.

6. A portable electronic insect controller as claimed in claim 5 further including a safety interconnect means for electrically connecting the power supply means to the grid means and preventing the refueling of the lantern without disconnecting the grid means from the power supply means.

7. A portable electronic insect controller as claimed in claim 6 wherein the power supply means includes a direct current power source electrically connected to a converter for stepping up the voltage in excess of one and one-half kilovolts, said voltage passing to the safely interconnect means.

8. A portable electronic insect controller as claimed in claim 5 wherein said lantern includes a fuel refill opening and a cap normally closing said refill opening, a safety interconnect means includes a separable strap electrically extending between said power supply means and said grid means and being positioned in covering relation over said cap whereby said strap must be separated thereby opening a circuit including said power supply means and said grid means before said cap can be removed from said refill opening to permit refueling of said lantern.

9. A portable electronic insect controller, comprising:
   an electrified grid means being alternately polarized with a high voltage in association with a light producing camping lantern for electrocuting insects when they move within close proximity of the grid;
   a power supply means for supplying a controlled source of electrical energy to the grid;

said grid means including a plurality of spaced apart bars, said bars being electrically isolated from each other with adjacent bars having opposite electrical charges;

said grid means further including a grid bracket operatively connecting said bars to the lantern to securely hold said bars in a fixed position; and a safety interconnect means for electrically connecting the power supply means to the grid means and preventing the refueling of the lantern without disconnecting the grid means from the power supply means.

10. A portable electronic insect controller as claimed in claim 9 further including a guard spaced from and overlaying the grid means for preventing accidental contact with the grid means.

11. A portable electronic insect controller as claimed in claim 9 wherein the power supply means includes a direct current power source electrically connected to a converter for stepping up the voltage in excess of one and one-half kilovolts, said voltage passing to the safety interconnect means.

12. A portable electronic insect controller as claimed in claim 9 wherein said lantern includes a fuel refill opening and a cap normally closing said refill opening, said safety interconnect means includes a separable strap electrically extending between said power supply means and said grid means and being positioned in covering relation over said cap whereby said strap must be separated thereby opening a circuit including said power supply means and said grid means before said cap can be removed from said refill opening to permit refueling of said lantern.

13. A portable electronic insect controller as claimed in claim 10 wherein said lantern includes a fuel refill opening and a cap normally closing said refill opening, said safety interconnect means includes a separable strap electrically extending between said power supply means and said grid means and being positioned in covering relation over said cap whereby said strap must be separated thereby opening a circuit including said power supply means and said grid means before said cap can be removed from said refill opening to permit refueling of said lantern.

14. A portable electronic insect controller, comprising:

an electrified grid means being alternately polarized with a high voltage in association with a light producing camping lantern for electrocuting insects when they move within a close proximity of the grid;

a power supply means for supplying a controlled source of electrical energy to the grid;

said grid means including a plurality of spaced apart bars, said bars being electrically isolated from each other with adjacent bars having opposite electrical charges;

said grid means further including a grid bracket operatively connecting said bars to the lantern to securely hold said bars in a fixed position;

a guard spaced from and overlaying the grid means for preventing accidental contact with the grid means, a safety interconnect means for electrically connecting the power supply means to the grid means and preventing the refueling of the lantern without disconnecting the grid means from the power supply means.

15. A portable electronic insect controller as claimed in claim 14 wherein the power supply means includes a direct current power source electrically connected to a converter for stepping up the voltage in excess of one and one-half kilovolts, said voltage passing to the safety interconnect means.

* * * * *